United States Patent [19]
Andres et al.

[11] 3,746,393
[45] July 17, 1973

[54] SAFETY BELT INSTALLATION

[75] Inventors: Rudolf Andres; Erwin Kölle, both of Sindelfingen; Rudolf Binder, Schonaich, all of Germany

[73] Assignee: Daimler-Benz Aktiengesellschaft, Stuttgart-Unterturk, Germany

[22] Filed: Aug. 6, 1971

[21] Appl. No.: 169,613

[30] Foreign Application Priority Data
Aug. 6, 1970 Germany............... P 20 39 103.1

[52] U.S. Cl............ 297/385, 297/388, 280/150 SB
[51] Int. Cl............................................ A62b 35/60
[58] Field of Search.................. 297/385, 388, 389, 297/216; 280/150 SB; 244/122 R, 122 B; 248/393, 394, 396, 397

[56] References Cited
UNITED STATES PATENTS

| | | | |
|---|---|---|---|
| 2,947,353 | 8/1960 | Von Wimmersperg............ | 297/385 |
| 3,186,760 | 6/1965 | Lohr et al......................... | 297/385 |
| 3,288,422 | 11/1966 | Krause............................. | 297/385 X |
| 3,377,102 | 4/1968 | Henrickson...................... | 297/385 |
| 3,667,805 | 6/1972 | Apri................................. | 297/385 X |

Primary Examiner—James T. McCall
Attorney—Craig, Antonelli & Hill

[57] ABSTRACT

A safety belt installation for vehicles, especially for motor vehicles with adjustable seats, in which at least one belt section is connected with the body or the frame of the vehicle by means of an anchoring fitting of which parts thereof are able to follow the adjusting movements of the seat and which is locked in all adjusted positions of the seat by the tensioning of the belt; at least one of the fitting elements includes a toothed rack while another fitting element is pivotally connected at the seat whereby during tensioning of the safety belt, a fitting element engages into the toothed rack against the force of a disengaging spring.

12 Claims, 5 Drawing Figures

PATENTED JUL 17 1973  3,746,393
FIG. 1
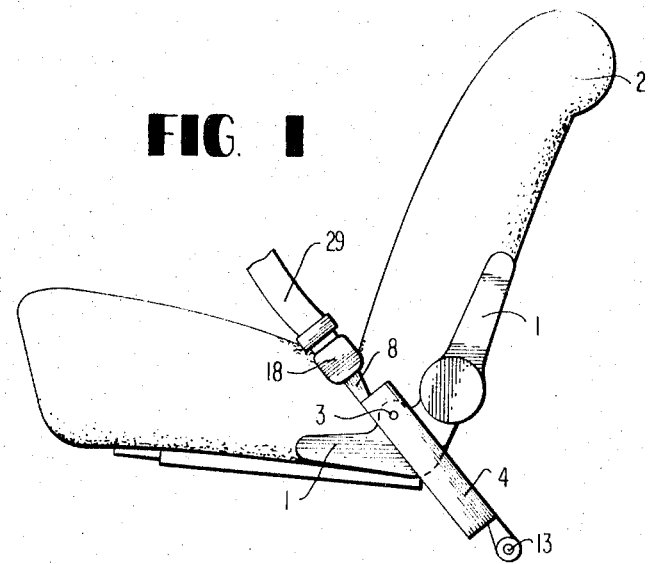
FIG. 2
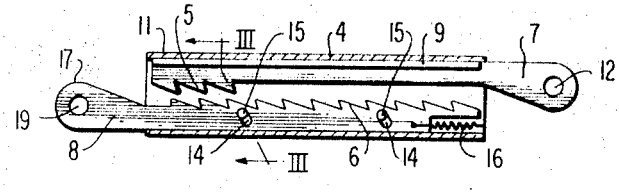
FIG. 3
FIG. 4
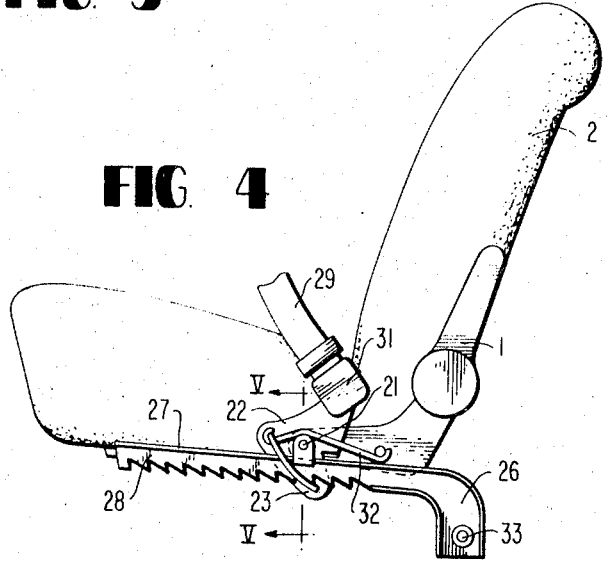
FIG. 5
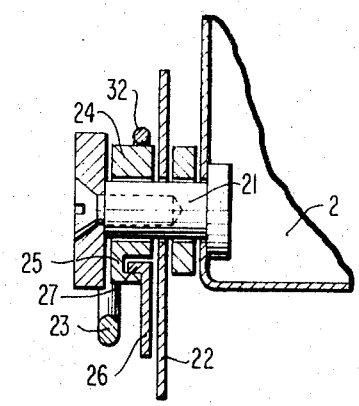
INVENTORS
RUDOLF ANDRES, ERWIN KÖLLE
RUDOLF BINDER
BY Craig, Antonelli & Hill
ATTORNEYS

SAFETY BELT INSTALLATION

The present invention relates to a safety belt installation for vehicles, especially for motor vehicles, with adjustable seats, in which at least one belt section is connected with the body or the frame of the vehicle by means of an anchoring fitting, of which parts are able to follow the adjusting movements of the seat and which is latched in all adjusting positions of the seat by tensionally stressing the belt.

The purpose of such safety belt installations is to automatically adapt the same to the changed position of the front seats and to lock the same automatically during the tightening of the belt.

The front seats of motor vehicles are, in most cases, adjustable in the longitudinal direction thereof. As a result of this adjustment, with the known installations of this type in case of the adjustment of the seat in the forward or backward direction also the position of the belt fastening means changes with respect to the position of the seat. Since the belt lock or buckle consists, for the most part of two parts, at least one of these buckle or lock parts should always be at the same predetermined place of the seat for the purpose of improved manipulation, independently of whether the position of the seat has been changed. By fastening this lock portion at the seat itself, an adaptation could be readily undertaken as such. However, the fastening of this belt buckle portion at the seat is rejected for various other reasons, and securing at the body or frame of the vehicle is preferred.

Safety belt installations for motor vehicles are known already which adapt themselves to the movement of the seat when the latter is displaced forwardly or rearwardly. The aim of the present invention, however, resides in adapting the safety belt installation to the position of the seat in its adjustment not only in the forward and rearward direction but also to enable its adaptation in case of the adjustment of the seat in the upward or downward direction which has become quite possible in the recent past. Additionally, a safety belt installation is to be provided by the present invention which can be manufactured in a simple manner and which additionally readily adapts itself to the changed position of the seat as well as which locks during tightening of the belt.

The underlying problems are solved according to the present invention in that at least one fitting element includes a toothed rack, in that at least one fitting element is pivotally secured at the seat and in that a fitting element of the safety belt installation engages during tensioning of the safety belt into the toothed rack against the force of a disengaging spring.

According to a further feature of the present invention, two sections of fitting elements carrying toothed racks may project into a sleeve which is pivotally mounted at the hinge of the seat so as to be displaceable in a longitudinal plane, of which one toothed rack section is guided in a longitudinal groove of the sleeve so as to be displaceable only longitudinally whereas the other toothed rack section can additionally carry out a transverse displacement directed toward the one toothed rack section, which transverse displacement is positively realized by the guidance of pins in inclined slots during the tensioning of the belts.

Furthermore, the safety belt installation according to the present invention may also be so constructed that a fitting element provided with a hook-shaped tooth means is pivotally connected at the hinge of the seat, which during the tightening of the belt engages in a toothed rack section of another fitting element against the force of a spring, which other fitting element, on the one hand, is pivotally connected at the body of the vehicle and whose toothed rack section, on the other hand, is longitudinally displaceably guided in a guide sleeve pivotally connected with the point of pivotal connection of the one fitting element.

Accordingly, it is an object of the present invention to provide a safety belt installation which avoids by simple means the aforementioned shortcomings and drawbacks encountered in the prior art.

Another object of the present invention resides in a safety belt installation which is simple in construction and relatively inexpensive to manufacture, yet is able to adapt itself automatically to the changed position of the seat.

A further object of the present invention resides in a safety belt installation which is able to adapt itself to changes in the position of the seat not only in the longitudinal direction but also in the vertical direction.

These and other objects, features, and advantages of the present invention will become more apparent from the following description when taken in connection with the accompanying drawing which shows, for purposes of illustration only, two embodiments in accordance with the present invention and wherein:

FIG. 1 is a side view of a seat of a motor vehicle with a safety belt installation according to the present invention;

FIG. 2 is a fitting, partially in cross section and on an enlarged scale, of the safety belt installation of FIG. 1;

FIG. 3 is a cross-sectional view, taken along line III—III of FIG. 2;

FIG. 4 is a side view of a modified embodiment of a safety belt installation according to the present invention; and FIG. 5 is a cross-sectional view, on an enlarged scale, taken along line V—V of FIG. 4.

Referring now to the drawing wherein like reference numerals are used throughout the various views to designate like parts, and more particularly to FIGS. 1–3, in the embodiment illustrated in these figures, a sleeve 4 is pivotally connected at the hinge 1 of the horizontally and vertically adjustable seat 2 in the point of pivotal connection 3 in such a manner that it can be pivoted in a vertical longitudinal plane of the vehicle. Two sections carrying toothed racks 5 and 6 of fitting elements 7 and 8 are guided in this sleeve 4 constituting also a fitting element. The section of the fitting element 7 guided in the sleeve 4 is provided on one side with a bar 9 which projects into a groove 11 of the sleeve 4 so that the section of the fitting element 7 provided with the toothed rack 5 can be displaced in the sleeve 4 only in the longitudinal direction of the latter. The free end of the fitting element 7 projecting out of the sleeve 4 is provided with a bore 12 by means of which it is pivotally connected at the body or at the frame of the vehicle by means of a bolt 13. The other fitting element 8 having the toothed rack 6 also projects into the sleeve 4 with the section thereof carrying this toothed rack. By reason of the inclined slots 14 arranged in the toothed rack section 6, into which engage the pins 15 secured in the sleeve 4, the fitting element 8 can move only obliquely to the longitudinal direction of the sleeve 4 against the force of the spring 16 during a tension in the longitudinal direction of the sleeve 4 so that during such a movement the teeth of the toothed rack 6 engage into the teeth of the toothed rack 5 and thereby lock the belt section 18 pivotally connected to the free end 17 of the fitting element 8 projecting out of the sleeve 4, which belt section 18 is pivotally connected at point 19 at the fitting element 8.

In the embodiment illustrated in FIGS. 4 and 5, a fitting element 22 provided with a hook-shaped tooth means 23 is pivotally connected at the hinge 1 of the seat 2 adjustable again vertically and horizontally by means of the bolt 21. Additionally, the bolt 21 also pivotally carries a guide sleeve 24 which is provided with a groove 25. A bar 27 provided at the fitting element 26 engages into this groove 25 so that this fitting element 26 can be displaced with respect to the guide sleeve 24 in the longitudinal direction of the groove 25 and of the bar 27. The fitting element 26 is provided with a toothed rack section 28 into which engages the hook-shaped tooth means 23 when the fitting element 22 during tensioning of the belt 29 is pivoted in the counterclockwise direction about the bolt 21 by way of belt section 31 pivotally connected to the fitting element 22 and against the force of the spring 32. The fitting element 26, as to the rest, is pivotally connected by means of the bolt 33 at the body or at the frame of the vehicle.

During non-tensioning of the safety belt, the seat can be adjusted in both embodiments forwardly or rearwardly or also in its height. Only when the belt is tensioned which must take place of course with a fixed seat, the locking means provided in each case engages, and the belt is secured in the prevailing position of the seat and the tensional force exerted thereon is transmitted to the frame or body of the vehicle.

While we have shown and described two embodiments in accordance with the present invention, it it understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A safety belt installation for vehicles, especially for motor vehicles, with adjustable seats, in which at least one belt section is connected with a fixed part of the vehicle by fitting means having several fitting elements, of which some are able to follow the adjusting movements of the seat, and which is locked in all adjusting positions of the seat by tensionally stressing the belt, characterized in that at least a fitting element includes a toothed rack, in that at least another fitting element is pivotally connected at the seat, and in that one of said fitting elements engages during the tensioning of the safety belt into the toothed rack against the force of a disengaging spring means.

2. A safety belt according to claim 1, characterized in that sections carrying two toothed racks of fitting elements project into another fitting element, of which one toothed rack section of a first one of said fitting elements is only longitudinally displaceably guided in a longitudinal groove of said another fitting element whereas the other toothed section of a second of said fitting elements is additionally able to carry out transverse displacements directed toward the one toothed rack section.

3. A safety belt installation according to claim 2, characterized in that the transverse displacements are positively obtained by the guidance of pins in inclined slots during the tensioning of the belt.

4. A safety belt installation according to claim 3, characterized in that said first fitting element is pivotally connected to the fixed part and said second fitting element is pivotally connected to the belt.

5. A safety belt installation according to claim 4, characterized in that said another fitting element is pivotally mounted at the seat.

6. A safety belt installation according to claim 5, characterized in that said another fitting element is a sleeve which is pivotally connected at a hinge of the seat so as to be pivotal in a vertical longitudinal plane.

7. A safety belt installation according to claim 2, characterized in that said first fitting element is pivotally connected to the fixed part and said second fitting element is pivotally connected to the belt.

8. A safety belt installation according to claim 2, characterized in that said another fitting element is pivotally mounted at the seat.

9. A safety belt installation according to claim 2, characterized in that said another fitting element is a sleeve which is pivotally connected at a hinge of the seat so as to be pivotal in a vertical longitudinal plane.

10. A safety belt installation according to claim 1, characterized in that a first one of said fitting elements is provided with a hook-shaped tooth means and is pivotally connected with the seat, said tooth means engaging in a toothed rack section of a second of said fitting element as a result of the pivotal movements of the first fitting element produced by a tensioning of the belt against the force of a spring means, the second fitting element being pivotally connected at the fixed part of the vehicle and the toothed rack section thereof being longitudinally displaceably guided in a third fitting element pivotally connected with the first fitting element.

11. A safety belt installation according to claim 10, wherein the third fitting element is pivotally connected with first fitting element at the point of pivotal connection of the latter with the seat.

12. A safety belt installation according to claim 11, wherein said third fitting element is a guide sleeve.

* * * * *